United States Patent [19]

Banik et al.

[11] Patent Number: 4,479,391
[45] Date of Patent: Oct. 30, 1984

[54] RESONATOR FORCE TRANSDUCER ASSEMBLY

[75] Inventors: Gary J. Banik; Errol EerNisse, both of Salt Lake City, Utah; Walter P. Kistler, Redmond; Jerome Paros, Kirkland, both of Wash.

[73] Assignee: Quartex, Inc., Salt Lake City, Utah

[21] Appl. No.: 482,041

[22] Filed: Apr. 4, 1983

[51] Int. Cl.³ .............................................. G01L 1/10
[52] U.S. Cl. .............................. 73/862.59; 73/DIG. 1
[58] Field of Search ......... 73/862.59, 862.41, DIG. 1, 73/517 AV; 177/210 FP

[56] References Cited

U.S. PATENT DOCUMENTS

| 3,238,789 | 3/1966 | Erdley | 73/862.59 |
| 4,215,570 | 8/1980 | EerNisse | 73/862.59 |
| 4,221,131 | 9/1980 | Albert | 73/517 AV |

FOREIGN PATENT DOCUMENTS 0777493 11/1980 U.S.S.R. ........................... 73/862.59

Primary Examiner—Anthony V. Ciarlante
Attorney, Agent, or Firm—Thorpe, North & Western

[57] ABSTRACT

A resonator force transducer assembly includes an elongate base element, a first arm disposed generally in parallel with a front portion of the base element, a first hinge joining the arm near a rear end thereof to the base element at about the middle thereof, an elongate resonator element such as a quartz crystal attached to the front ends of the arm and base element to extend therebetween, a second arm disposed generally in parallel with a rear portion of the base element, and a second hinge joining the second arm to the base element. A third hinge joins the front end of the second arm to the rear end of the first arm to form a type of compound lever arrangement so that when a force is applied to the second arm to urge it either toward or away from the base element, a portion of this force is transmitted via the third hinge to the first arm to urge it either away from or toward the base element to thereby stress the quartz resonator element. The force applied to the second arm can be measured by causing the quartz resonator element to vibrate and then taking measurements of the change in frequency with the application of force. To protect the quartz resonator element and the rest of the force transducer assembly from corrosive effects of the environment and from ambient perturbations which may introduce error in the force measurement, the entire assembly is disposed in a vacuum enclosure. The force to be measured is then transmitted to the second arm via a rod which is attached to the arm and which extends through an opening in the enclosure. A seal between the second arm and the opening in the enclosure is provided by bellows, and another bellows in opposing relationship is provided to compensate for the effect of atmospheric pressure on the second arm introduced through the first mentioned bellows.

20 Claims, 5 Drawing Figures 4,479,391

RESONATOR FORCE TRANSDUCER ASSEMBLY

BACKGROUND OF THE INVENTION

This invention relates to a resonator force transducer assembly especially adapted for measuring relatively large forces.

Resonator force transducers consisting typically of either a single or double-bar vibratory elements made of quartz or similar rigid material have been proposed for a variety of uses such as measurement of acceleration, measurement of pressure and in general measurement of any parameter which can be translated into a force. See for example U.S. Pat. Nos. 3,238,789 and 4,215,570. The force measurement is made in such devices by causing the bar or bars to vibrate, applying the forces along the longitudinal axes of the bars, and then determining the change in frequency of vibration of the bars caused by the applied force. This operation is fully described in the two cited references.

The double-bar transducer arrangement is proving especially advantageous because of the high mechanical Q which can be achieved, at least with those which utilize a rigid material such as quartz, and this, in turn, provides high resolution. Also, such transducers provide long term stability and may be easily and reliably fabricated in miniaturized form by photolithographic and chemical etching processes. However, with the increase in resolution and sensitivity and the decrease in size, the magnitude of the forces which can be measured is decreased because of the fragility of the transducer element.

SUMMARY OF THE INVENTION

It is an object of the invention to provide a resonator force transducer assembly which is capable of measuring relatively large forces while protecting the resonator element from injury or damage.

It is also an object of the invention to provide such an assembly which is simple in construction and easy to fabricate.

It is a further object of the invention to provide such an assembly which is accurate over a wide range of environmental conditions.

It is an additional object of the invention to provide such an assembly which is relatively immune from the effects of acceleration forces resulting from movement of the assembly.

It is another object of the invention to provide such an assembly which is capable of measuring relatively large forces, and yet is relatively small and compact in design and structure.

The above and other objects of the invention are realized in a specific illustrative embodiment which includes an elongate base element, and a first arm arranged generally in parallel with a front portion of the base element and pivotally joined thereto, with the pivot joint being disposed near a rear end of the arm and at about the midpoint of the base element. The front ends of the arm and the base element terminate at about the same distance from the pivot joint. A resonator element, such as a double-bar quartz transducer, is attached to the front ends of the arm and base element to extend therebetween. A second arm is arranged generally in parallel with a rear portion of the base element and is pivotally joined to the base element. A hinge joins the front end of the second arm to the rear end of the first arm so that when a force is applied to the second arm to urge it to pivot either toward or away from the base element, a much reduced force is transmitted via the hinge to the first arm to urge it to pivot away from or toward the base element to thereby stress the resonator element. The force being applied to the second arm can thus be determined as the force detected by the resonator element multiplied by the force reduction factor produced by the compound lever action of the first and second arms.

In accordance with one aspect of the invention, the first and second arms and base element are disposed in a hermetically sealed housing to prevent exposure of the resonator element and remainder of the assembly from debilitating effects of the environment. The force to be measured is applied to the second arm by way of a rod which extends through an opening in the housing and is attached to the second arm. A bellows surrounds the rod, with one end of the bellows being sealingly attached in the opening and the other end being sealingly attached to the second arm to seal the interior of the housing from the exterior. A second opening is provided in the housing on the opposite side from the first opening and also in the base element, and a second bellows is disposed in the second opening, with one end of the bellows being sealingly attached in the second opening and the other end being sealingly attached to the side of the second arm opposite that to which the rod is attached. This "opposed bellows" arrangement equalizes the outside pressure being applied to the second arm while providing a mechanical path for the rod to enter the housing from the outside.

In accordance with another aspect of the invention, the masses of the arms, location of the pivot joint of the first arm, and location of the hinge are selected so as to cancel the moments of the first and second arms produced by the acceleration forces to which the resonator element may be subjected as a result of movement of the assembly.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
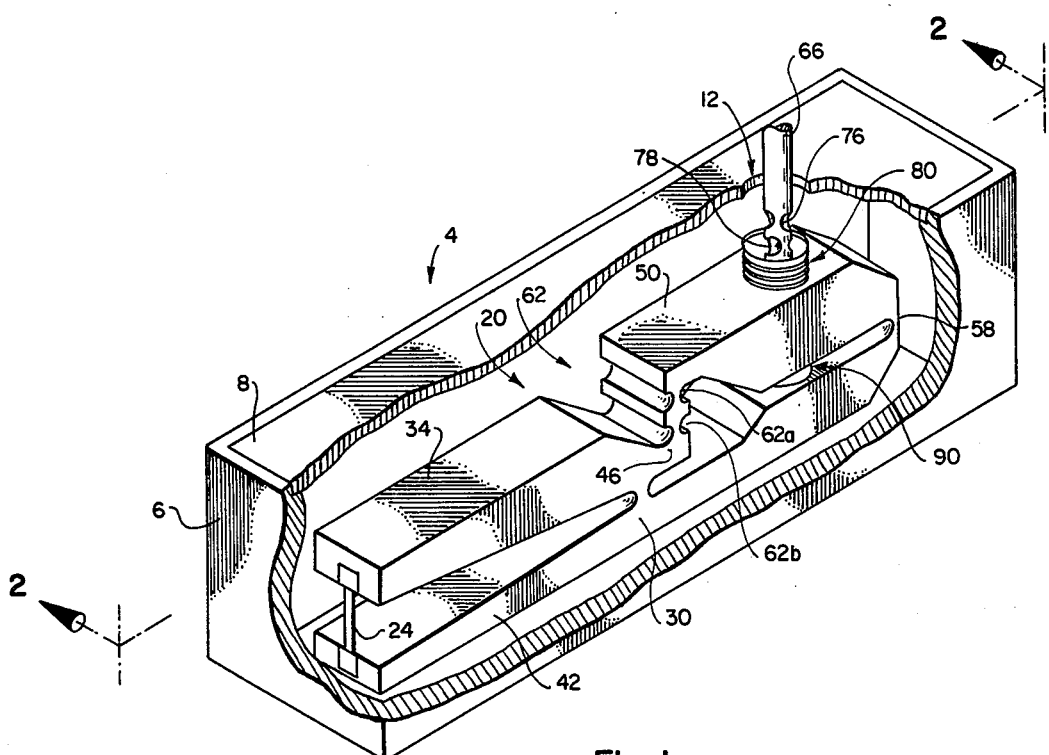
FIG. 1 is a perspective, partially cut-away view of a resonator force transducer assembly made in accordance with the principles of the present invention.

Referring to the drawings there is shown a specific illustrative embodiment of the present invention which includes a hermetically sealed housing 4 composed of a case 6 and a lid 8. The housing 4 is shown to be generally rectangular in transverse and longitudinal cross section, but it should be understood that a variety of other shapes could also be employed. An opening 12 is formed in the lid 8 for purposes to be described hereafter, and a second opening 16 is formed on the opposite side of the housing.

Mounted in the housing 4 is a structure 20 on which is mounted a resonator or vibratory element 24. Advantageously, the resonator element is a substantially rigid double or single bar quartz crystal as described earlier. Alternatively, the resonator element could be non-rigid such as a wire, or the like. Conventional circuitry would also be provided for causing the element 24 to vibrate and for determining the frequency of vibration, but such circuitry is not shown in the drawings The structure 20 on which the resonator element 24 is mounted includes an elongate base element 30 attached to and supported by the bottom wall of the housing 4. A forward arm 34 is pivotally mounted on the base element 30 by way of a pivot joint or hinge 38 so that the arm 34 is disposed to be generally parallel with a forward portion 42 of the base element 30. As can be seen from the drawings, the front end of the arm 34 and the front end of the base element 30 terminate about the same distance from the pivot joint or hinge 38. This ensures that the forces which are applied to the resonator element 24 by reason of pivoting of the arm 34 are applied substantially uniformly along the longitudinal axis of the resonator element. The pivot hinge 38 joins the arm 34, near the arm's rear end, to the base element 30 at about the midpoint of the base element. A short portion 46 of the arm 34 extends rearwardly of the pivot hinge 38 to present a lever mechanism.

A rearward arm 50 is pivotally joined to a rear portion 54 of the base element 30 by way of a pivot joint or hinge 58. The pivot hinge 58 joins the arm 50 and base element 30 at the rear ends thereof. The front end of the arm 50 is joined to the rear end of the arm 34 by way of a double hinge 62. The double hinge 62 is formed with two stacked flexure points 62a and 62b to enable bending at both points in the plane of the arms 34 and 50 and thus to allow relative longitudinal movement of the arms.

The structure 20 provides a type of compound lever arrangement in which a force applied to arm 50 will urge the arm to pivot about the pivot hinge 58 either toward or away from the base element 30 and, in turn, urge the arm 34 to pivot about pivot hinge 38 respectively away from or toward the base element 30. A force applied to the pivot arm 50 thus results in a much reduced force (reduced by the compound lever arrangement) to be applied to the resonator element 24. If the force applied to the arm 50 tends to pivot the arm away from the base element 30, then the resonator element 24 will be subjected to a compressive force, whereas if the force applied to the arm 50 tends to pivot the arm toward the base element 30, then the resonator element 24 will be subjected to a tensile force. (Of course, if the resonator element 24 is to be subjected to compressive forces, then a substantially rigid element would be used.) A change in force applied to the resonator element 24, of course, will cause a change in frequency of vibration of the element and thus will provide a measure of the force being applied to the arm 50.

Figure 2:
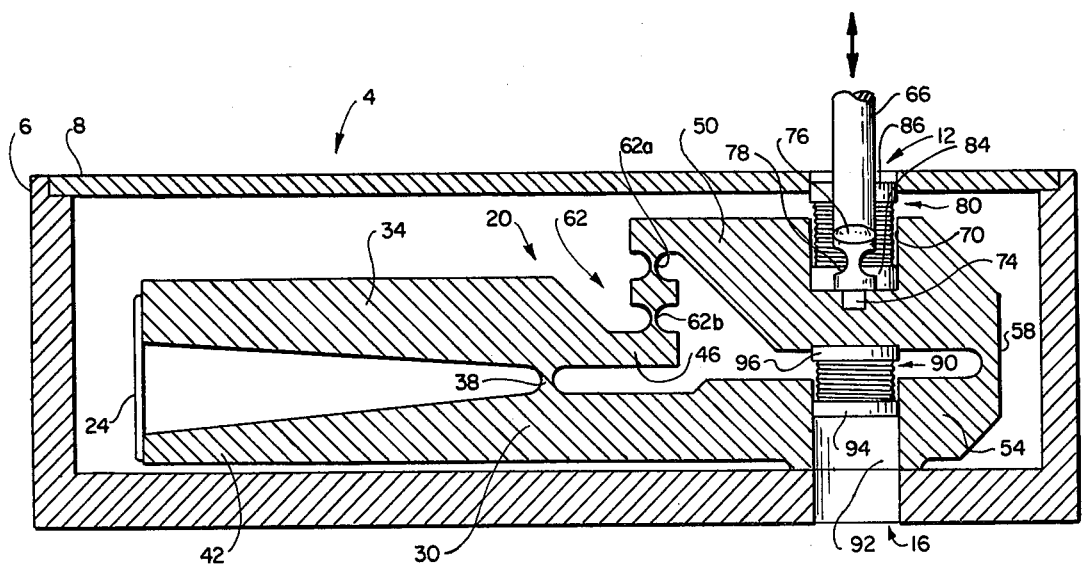
FIG. 2 is a side, cross-sectional view of the assembly of FIG. 1.

Advantageously, the pivot hinges 38 and 58 and the double hinge 62 are integrally formed with the base element 30, forward arm 34 and rearward arm 50, as shown in FIG. 2. These components may be formed of a material such as aluminum, beryllium copper, or other high grade spring material to provide desired rigidity of the base element 30, arm 34 and arm 50, while allowing flexibility of pivot hinges 38 and 58, and double hinge 62. Alternatively, the pivot hinges 38 and 58 and the double hinge 62 could be separately fabricated elements attached to the base element 30 and arms 34 and 50, as the case may be, at the locations shown. The double hinge 62 is formed as shown to allow transverse flexure of the hinge (double bending) while not allowing longitudinal flexure.

A force exterior to the housing 4 is applied to the arm 50 by way of a push rod 66 which is disposed to extend through the opening 12 and into a recess 70 formed in the arm 50. The end of the push rod 66 which extends through the opening 12 is attached to the arm 50 by epoxy 74 or similar adhesive. The lower end of the push rod 66 is formed with two orthogonal flexure joints 76 and 78 to allow flexure of the rod 66 in either of two orthogonal directions. Thus, the upper end of the push rod 66 which receives the force to be measured is allowed some movement relative to the housing 4.

In order to maintain isolation of the inside of the housing 4 from the outside, a conventional bellows 80 is disposed about the rod 66, with one end 84 of the bellows being sealingly attached to the arm 50, and the other end of the bellows being sealingly attached to the perimeter of the opening 12. The bellows 80 thus allows the rod to move longitudinally while sealing the interior of the housing 4 from the exterior thereof.

Of course, provision of the bellows 80 to allow a mechanical path for the push rod 66 would result in outside pressure being applied to one side of the arm 50. This would cause error in force measurements unless the outside pressure were precisely known or unless some method of compensating for the outside pressure applied to the arm 50 could be provided. A bellows 90 is provided to compensate for such outside pressure and is disposed in the opening 16 in the housing 4 and in a coincident opening 92 in the base element 30. One end 94 of the bellows 90 is sealingly attached to the perimeter of the opening 92 while the other end 96 of the bellows is sealingly attached to the side of the arm 50 opposite that to which the rod 66 and bellows 80 are attached. The axes of the bellows 80 and 90 are generally colinear so that the moment caused by outside pressure applied through bellows 80 to the arm 50 is offset by an equal and opposite moment caused by pressure applied to bellows 90. The moments caused by the forces on the opposed pair of bellows 80 and 90 thus cancel to eliminate any error in force measurement. Of course, the cross sectional area of the bellows should be the same to ensure a cancellation of the pressures applied to the bellows.

Error in force measurement might also be introduced if acceleration forces caused by movement of the housing 4 during measurement were applied to the arms 34 and 50 so as to cause unequal moments of force on the arms (tending to cause the arms to pivot counterclockwise). To obviate this, the masses of the arms 34 and 50, location of the pivot hinge 38 and location of the double hinge 62 are selected so that the moments of the arms 34 and 50 substantially cancel. Thus, if the housing 4 is moved either upwardly or to the right (in reference to FIG. 2), the acceleration forces on the lever system are such that the moment on arm 34 is cancelled by the moment on arm 50 and so no error will be introduced in measurement of the force. Also, even if force measurements were not made while the housing 4 were being moved, it would be desirable to balance the lever system so as to prevent any damage to the resonator element 24 which might otherwise occur as a result of acceleration forces.

Figure 3:
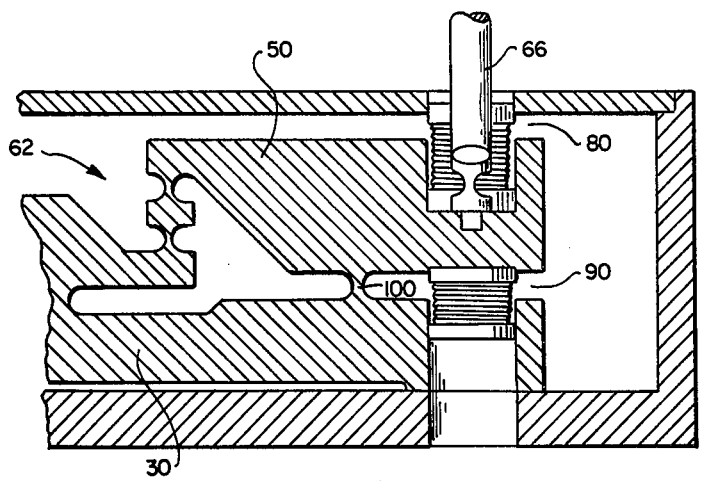
FIG. 3 is a side, cross-sectional, fragmented view of an assembly showing an alternative arrangement for pivotally mounting the second arm.

An alternative arrangement to that shown in FIG. 2 where the pivot hinge for arm 50 is located at the rear end of the arm, is to locate the hinge forwardly on the arm as shown in FIG. 3. In the FIG. 3 arrangement, a pivot hinge 100 for the arm 50 is located some distance from the rear end of the arm, and the push rod 66 is joined to the arm near the rear end thereof. A force applied to the arm 50 to cause the front end of the arm to pivot upwardly will result in the resonator element (not shown in FIG. 3) being subjected to a compressive force, whereas a force applied to the arm 50 to cause the front end to pivot dowwardly will result in the resonator element being subjected to a tensile force. This, of course, is just the opposite result from the application of forces to the arm 50 in the FIG. 2 arrangement. Either lever arrangement serves to reduce the magnitude of force applied to the resonator element from that applied by the push rod.

Figure 4:
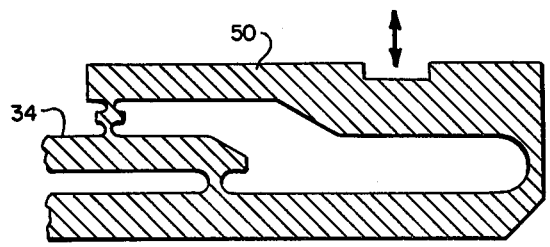
FIG. 4 is a side, cross-sectional, fragmented view of an assembly showing another arrangement for pivotally mounting the first arm and for joining the first and second arms.
Figure 5:
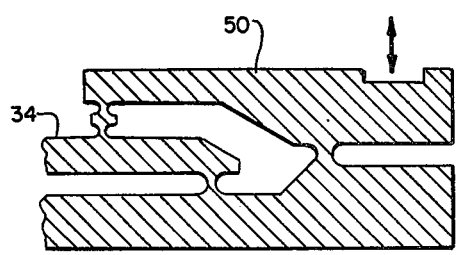
FIG. 5 is a side, cross-sectional, fragmented view of an assembly showing still another arrangement for pivotally mounting and joining the first and second arms.

FIGS. 4 and 5 show still other arrangements for mounting and joining the arms 34 and 50. In FIG. 4, a force applied downwardly against the arm 50 will result in a compressive force being applied to the resonator element (not shown in FIG. 4), and vice versa. In FIG. 5, a force applied downwardly against the arm 50 will result in a tensile force being applied to the resonator element, and vice versa. The arrangements of FIGS. 4 and 5 cannot be as effectively immunized from the effects of acceleration as can those of FIGS. 1, 2 and 3, but for some applications the FIGS. 4 and 5 structures may be desirable.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A resonator force transducer assembly comprising an elongate base element,
   a first arm arranged generally in parallel with a front portion of the base element and pivotally joined thereto, with the pivot joint being disposed near a rear end of the arm and about the midpoint of the base element and with a front end of the arm and a front end of the base element terminating at about the same distance from the pivot joint,
   resonator means attached to the front ends of the arm and base element to extend therebetween,
   a second arm arranged generally in parallel with a rear portion of the base element and pivotally joined to the base element,
   means for applying a force to the second arm, and
   hinge means joining a front end of the second arm to the rear end of the first arm so that when a force is applied to the second arm, the second arm transmits a portion of this force via the hinge means to the first arm to urge it to pivot about the pivot joint of the first arm and thereby stress the resonator means.

2. The assembly of claim 1 wherein said hinge means comprises a pair of hinges arranged in a stacked relationship to enable relative movement longitudinally between the first and second arms.

3. The assembly of claim 1 wherein said second arm is pivotally joined at a rear end of the arm to a rear end of the base element, and wherein the force is applied to the second arm at a location between the front end and rear end of the arm.

4. The assembly of claim 1 wherein said second arm is pivotally joined to the base element at a first location on the second arm between front and rear ends thereof, and wherein the force is applied to the second arm at a second location between the first location and the rear end of the arm.

5. The assembly of claim 1 wherein the resonator means comprises a substantially rigid resonator element capable of withstanding certain compressive and tensile forces.

6. The assembly of claim 5 wherein the rigid element is a double-bar resonator element.

7. The assembly of claim 5 wherein the rigid element is a single-bar resonator element.

8. The assembly of claim 1 wherein the resonator means comprises a non-rigid resonator element.

9. The assembly of claim 1 further comprising a hermetically sealed housing in which are mounted the base element and arms, said housing having an opening in one side thereof through which the force applying means applys forces to the second arm, and a seal means for flexibly sealing the force applying means in the opening.

10. The assembly of claim 9 wherein said force applying means comprises a rod which extends through the opening and is attached to one side of the second arm, wherein said seal means comprises a first bellows surrounding the rod, one end of the bellows being sealingly attached in the opening and the other end being sealingly attached to the second arm to seal the interior of the housing from the exterior, wherein said housing has a second opening on an opposite side thereof, and wherein said assembly further includes a second bellows, one end of which is sealingly attached in the second opening and the other end of which is sealingly attached to the other side of the second arm.

11. The assembly of claim 10 wherein the axes of the first and second bellows are generally colinear.

12. The assembly of claim 1 wherein the force applying means comprises a rod, one end of which is attached to the second arm, said rod including a first flexure joint for enabling the rod to flex in a first direction, and a second flexure joint adjacent to the first joint for enabling the rod to flex in a second direction generally orthogonal with the first direction.

13. The assembly of claim 1 wherein the masses of the first and second arms, location of the pivot joint of the first arm, and location of the pivot joint of the second arm are selected so that the moments of the first and second arms substantially cancel when the assembly is accelerated.

14. The assembly of claim 1 wherein the pivot joint of the first arm is integrally formed with the first arm and base element, and wherein the pivot joint of the second arm is integrally formed with the second arm and base element.

15. The assembly of claim 14 wherein the hinge means is integrally formed with the first and second arms.

16. A resonator force transducer assembly comprising
   an elongate base element, a first arm disposed generally in parallel with a front portion of the base element, a first hinge means joining the arm near a rear end thereof to the base element at about the middle thereof to allow pivoting of the arm with respect to the base element wherein front ends of the arm and base element terminate at about the same distance from the first hinge means, an elongate resonator element attached to the front ends of the arm and base element to extend therebetween, a second arm disposed generally in parallel with a rear portion of the base element, a second hinge means joining the second arm and the base element to allow pivoting of the second arm with respect to the base element, means for applying a force to the second arm in a direction to urge it to pivot about the second hinge means towards or away from the base element, and means joining a front end of the second arm to the first arm so that when a force is applied to the second arm, a force is also applied via the joining means to the first arm to urge it to pivot about the first hinge means toward or away from the base element to thereby stress the resonator element.

17. The assembly of claim 16 wherein said second arm is pivotally joined at a rear end of the arm to a rear end of the base element, wherein the front end of the second arm is joined to the rear end of the first arm rearwardly of the first hinge, and wherein the force is applied to the second arm at a location between the front end and rear end of the arm.

18. The assembly of claim 16 wherein said second arm is pivotally joined at a rear end of the arm to a rear end of the base element, wherein the front end of the second arm is joined to the first arm at a location forwardly of the first hinge, and wherein the force is applied to the second arm at a location between the front end and rear end of the arm.

19. The assembly of claim 16 wherein said second arm is pivotally joined to the base element at a first location on the second arm between front and rear ends thereof, wherein the front end of the second arm is joined to the rear end of the first arm rearwardly of the first hinge, and wherein the force is applied to the second arm at a location between the first location and the rear end of the arm.

20. The assembly of claim 16 wherein said second arm is pivotally joined to the base element at a first location on the second arm between front and rear ends thereof, wherein the front end of the second arm is joined to the first arm at a location forwardly of the first hinge, and wherein the force is applied to the second arm at a location between the first location and the rear end of the arm.

* * * * *